UNITED STATES PATENT OFFICE.

WILLIAM C. SMITH, OF LA FARGEVILLE, NEW YORK.

IMPROVED MEDICAL COMPOUND.

Specification forming part of Letters Patent No. 52,760, dated February 20, 1866.

*To all whom it may concern:*

Be it known that I, WILLIAM C. SMITH, of La Fargeville, Jefferson county, in the State of New York, have invented new and useful Improvements in Medical Compounds; and I do hereby declare that the following is a full, clear, and exact description thereof, which will enable others skilled in the art to make and use the same.

This invention relates to a compound intended to cure cholera and all chronic diseases of the bowels.

It is made as follows:

First, I take one gallon of fourth-proof brandy, four ounces of pulverized barberry, one pound of gum myrrha, which I grind fine, and two ounces of cayenn pepper, put the whole in a stone jar, stirring it up from the bottom every day for ten days, and then I strain off the liquid.

Second, I take two ounces of gum kino, put it in a quart bottle filled with brandy or whisky, and shake well together for six or eight days.

Third, I dissolve one-half ounce of camphor in half a pint of alcohol, and add two ounces of cloves, pulverized.

Fourth, I take five pounds of loaf-sugar, put in one pint of water, heat to the boiling-point, and when partly cool I add one-half ounce of opium dissolved in one gill of alcohol; and, finally, I mix all these solutions obtained by the above four manipulations together, and bottle the mixture for use.

This preparation can be kept for a long time when placed in a cellar or other cool spot, and it has proved to be an effectual cure of cholera and all chronic diseases.

What I claim as new, and desire to secure by Letters Patent, is—

A medical compound, made as herein described, for the purposes set forth.

WM. C. SMITH.

Witnesses:
M. M. LIVINGSTON,
W. HAUFF.